United States Patent
Shaw et al.

(10) Patent No.: US 8,075,144 B2
(45) Date of Patent: *Dec. 13, 2011

(54) INTEGRATED TELESCOPE BAFFLE AND MIRROR SUPPORT

(75) Inventors: William E. Shaw, Marlborough, MA (US); Michael E DeFlumere, Winchester, MA (US); Brian Foley, Nashua, NH (US); Walter P. Watson, Lowell, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 563 days.

This patent is subject to a terminal disclaimer.

(21) Appl. No.: 12/274,581

(22) Filed: Nov. 20, 2008

(65) Prior Publication Data

US 2011/0176205 A1   Jul. 21, 2011

(51) Int. Cl.
*G02B 27/00* (2006.01)

(52) U.S. Cl. .......................... 359/601; 359/399; 359/611

(58) Field of Classification Search .......... 359/364–366, 359/601–614, 399
See application file for complete search history.

(56) References Cited

U.S. PATENT DOCUMENTS

| | | | |
|---|---|---|---|
| 4,106,856 A * | 8/1978 | Babish | 359/602 |
| 4,161,835 A | 7/1979 | Lough | |
| 4,729,649 A | 3/1988 | Thompson | |
| 4,820,923 A | 4/1989 | Wellman | |
| 4,929,055 A * | 5/1990 | Jones | 359/601 |
| 5,189,554 A | 2/1993 | Vanasse et al. | |
| 5,191,469 A | 3/1993 | Margolis | |
| 5,225,931 A | 7/1993 | Stavroudis | |
| 5,298,752 A * | 3/1994 | Wight | 250/352 |
| 5,416,332 A | 5/1995 | Chen et al. | |

(Continued)

FOREIGN PATENT DOCUMENTS

WO   01/77734 A1   10/2001

OTHER PUBLICATIONS

U.S. Notice of Allowance mailed Feb. 17, 2011 in U.S. Appl. No. 12/274,574, filed Nov. 20, 2008.

(Continued)

*Primary Examiner* — Thong Nguyen
(74) *Attorney, Agent, or Firm* — Finch & Maloney PLLC; Neil F. Maloney

(57) ABSTRACT

A telescope design having an integrated baffle is disclosed herein. The integrated baffle is configured as both a baffle and a mirror support. The integrated baffle can be shaped to the F-cone between the primary and secondary mirrors of a given telescope design. The baffle design can be adjusted to minimize or otherwise reduce the total obscuration of the baffle to improve the optical throughput. The interior facing surfaces of the integrated baffle can be configured with corner reflectors, so that the detector views itself, instead of the baffle.

20 Claims, 7 Drawing Sheets

U.S. PATENT DOCUMENTS

| | | | |
|---|---|---|---|
| 5,969,860 | A | 10/1999 | Mearns |
| 6,596,997 | B2 | 7/2003 | Kaufman |
| 6,741,341 | B2 | 5/2004 | DeFlumere |
| 6,791,073 | B1 | 9/2004 | Bell et al. |
| 6,864,965 | B2 | 3/2005 | DeFlumere |
| 6,875,975 | B2 | 4/2005 | Faska et al. |
| 6,877,691 | B2 | 4/2005 | DeFlumere et al. |
| 6,901,220 | B1 | 5/2005 | Carlson et al. |
| 6,906,326 | B2 | 6/2005 | Koch et al. |
| 6,969,840 | B1 | 11/2005 | Theriault et al. |
| 7,110,171 | B2 | 9/2006 | Dane et al. |
| 7,238,960 | B2 | 7/2007 | Sundaram et al. |
| 7,276,681 | B2 | 10/2007 | Alexander et al. |
| 7,291,858 | B2 | 11/2007 | Sundaram et al. |
| 7,307,251 | B2 | 12/2007 | Frey, Jr. et al. |
| 7,619,720 | B1 | 11/2009 | Hayden et al. |
| 7,926,961 | B2 * | 4/2011 | Shaw et al. ............... 359/611 |
| 2004/0207914 | A1 | 10/2004 | Beach |
| 2009/0097124 | A1 * | 4/2009 | Lundgren ............... 359/613 |
| 2009/0212221 | A1 | 8/2009 | Fest et al. |

OTHER PUBLICATIONS

Amendment dated Feb. 10, 2011 in response to U.S. Final Office Action mailed Jan. 21, 2011, in U.S. Appl. No. 12/274,574, filed Nov. 20, 2008.

"Part II—Telescope Integration, Alignment and Tests", Document No. UVIT-PDR-009-2-Version 1.0—S. Sriram, Mar. 2006.

"Advanced Retroreflective Telescope Baffle"—E. Ray Huppi and Roy A. Austin, May 14, 1993.

Callender, United States Statutory Invention Registration No. H783, published Jun. 5, 1990, 4 pages.

Office Action mailed on Jun. 17, 2010, from related U.S. Appl. No. 12/274,574.

* cited by examiner

INTEGRATED TELESCOPE BAFFLE AND MIRROR SUPPORT

RELATED APPLICATIONS

This application is related to U.S. Pat. No. 7,926,961, filed Nov. 20, 2008, and titled "Low Background Flux Telescope with Integrated Baffle" which is herein incorporated by reference in its entirety.

FIELD OF THE INVENTION

The invention relates to optical systems, and more particularly, to telescopes used for detecting radiation.

BACKGROUND OF THE INVENTION

Telescopes generally include optics adapted to focus radiation (e.g., infrared, or IR radiation) onto a detector, such as a focal plane array (FPA). The FPA can be implemented with various known technology, such as charge-coupled devices, quantum well infrared photodetectors, strained superlattice, photovoltaic, photoconductive, or other such imaging devices. The FPA can be cooled, where it is operatively coupled with a Dewar cold finger or other cooling mechanism, but may also be uncooled (such as in the case of a microbolometer). Each cell of the FPA generates a detector current when a scene is imaged from a given field of view (FOV). Each detector current generated by the FPA is applied to the input of a corresponding integrator circuit included in a FPA read-out circuit and digitized or otherwise prepared for subsequent image processing.

In general, such radiation detectors are required to maintain performance in the presence of radiation that is unwanted or otherwise not of interest, including relatively intense radiation sources (solar and others) near the FOV. In such cases, a baffle can be used to prevent the undesired or so-called off-axis radiation from reaching the telescope and detector. In conventional designs, the baffle is cantilevered off, or otherwise appended to, the entrance aperture end of the optical telescope. In some cases, the baffle design may incorporate small cell cube corner retroreflectors to reflect off-axis radiation back out the entrance aperture of the baffle.

SUMMARY OF THE INVENTION

One embodiment of the present invention provides an optical system having an optical axis. The system includes a mirror for reflecting on-axis radiation, and an integrated baffle for preventing passage of off-axis radiation and for supporting the mirror in place on the optical axis. In one such case, the baffle supports the mirror by a collar or partial collar formed at the central portion of the baffle. The system may be, for example, a telescope having a Cassegrain configuration with a two mirror re-imager (e.g., clam-shell design). The system may include a detector for receiving on-axis radiation reflected by the mirror. The system may include a telescope housing having an optical aperture, and for containing the baffle and mirror of the system (and other optics of the system, if any). In one such configuration, the mirror is a secondary mirror, the system further includes a primary mirror for reflecting radiation that passes through the optical aperture toward the secondary mirror. The secondary mirror is for reflecting radiation from the primary mirror to a hole in the primary mirror. In one such configuration, the system further includes tertiary and quaternary mirrors, wherein the tertiary mirror is for reflecting radiation that passes through the hole in the primary mirror toward the quaternary mirror, and the quaternary mirror is for reflecting radiation from the tertiary mirror to a hole in the tertiary mirror. In one example case, the integrated baffle includes a plurality of channels which selectively pass on-axis radiation, but eliminate off-axis radiation (e.g., via reflection and/or absorption). In another example case, the integrated baffle is shaped to an F-cone of the system. For instance, consider the case where the mirror is a secondary mirror, the system further includes a primary mirror for reflecting radiation that passes through the optical aperture toward the secondary mirror. In such a case, the integrated baffle can be shaped to an F-cone between the primary and secondary mirrors. In another example case, the integrated baffle includes a plurality of channels each having a length and a diameter, and an aspect ratio of channel length to channel diameter is maintained as channel length tapers down from longer outer channels to shorter inner channels. In another example case, surfaces of the integrated baffle visible to a detector of the system are configured with a plurality of corner reflectors that are shaped to return impinging optical flux from inside the optical system back to its source.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION OF THE INVENTION

Figure 1:
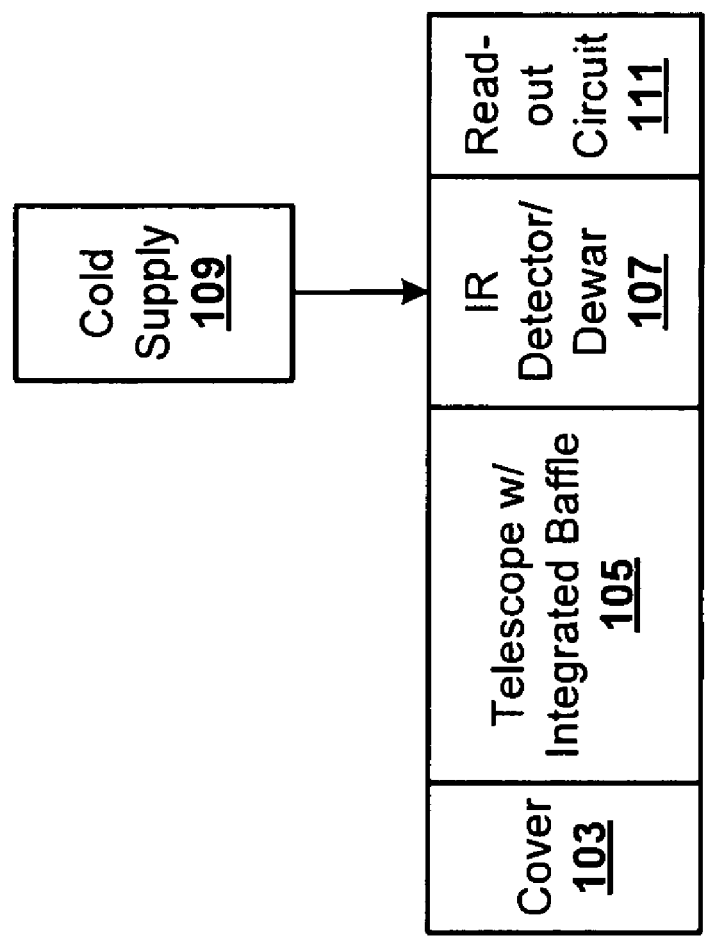
FIG. 1 is an optical system configured in accordance with an embodiment of the present invention.

A telescope design having an integrated baffle is disclosed herein. The integrated baffle is configured as both a baffle and a mirror support. The integrated baffle can be shaped to the F-cone between the primary and secondary mirrors of a given telescope design. The baffle design can be adjusted to minimize or otherwise reduce the total obscuration of the baffle to improve the optical throughput. The interior facing surfaces of the integrated baffle can be configured with corner reflectors, so that the detector views itself, instead of the baffle. The design can be configured to reduce both internally generated and external off-axis and stray light radiation. This design is appropriate for systems that have optical telescopes that operate to detect radiation, for example, from the ultraviolet (UV) range to the far IR range.

General Overview

There are a number of issues associated with using baffles as conventionally done. For example, when the baffle is cantilevered off the optical telescope, packaging and stability issues arise, particularly in the case of a gimbaled system. In addition, appending the baffle to the telescope substantially increases the length and weight of the optical system. Other more subtle issues associated with baffles exist as well. For instance, although a baffle can be used to mitigate or reduce external off-axis radiation, the baffle is within the FOV of the radiation detector. Thus, the detector 'sees' the baffle, which can exhibit significant heat. As such, the baffle can be a source of unwanted background flux. Other internal structures of the telescope that are within the FOV or otherwise visible to the detector (such as mirror support structures) can similarly be a source of unwanted background flux. Various optical systems (e.g., telescopes, cameras, and other embodiments of the present invention) can be configured to address one or more of these issues.

For instance, unlike conventional approaches where a baffle is appended to the end of the telescope, integration of the baffle into the telescope as described herein does not significantly increase the length of the telescope assembly. The integrated baffle can be used, for example, as a mirror support thereby effectively repurposing and more efficiently using the space usually allocated within the telescope housing for conventional mirror struts. In more detail, optics making up a telescope (e.g., such as the primary and/or secondary mirrors of a Cassegrain configuration) are typically secured in place with strut supports that hold one or more optics in alignment with the optical axis. In accordance with one embodiment of the present invention, the integrated baffle is configured as both a baffle and a mirror support.

In addition to, or alternatively, the integrated baffle can be shaped to the F-cone between the primary and secondary mirrors of a given telescope design to reduce the overall length of the optical system. In general, the baffle includes a plurality of channels which selectively pass on-axis radiation, but eliminate off-axis radiation (e.g., via reflection and/or absorption). In some such embodiments, the aspect ratio of the baffle (i.e., channel length to channel diameter cross-section) is maintained as the length tapers down from the longer outer channels to the shorter inner channels. The tapering of the baffle shape from the longer outer channels to the shorter inner channels essentially follows the envelope of the F-cone. Also, to keep the aspect ratio consistent over the entire baffle, the channel diameters decrease with decreasing channel length. In a more general sense, the baffle design can be adjusted to minimize or otherwise reduce the total obscuration of the baffle to improve the optical throughput.

In addition to, or alternatively, the integrated baffle can be configured with corner reflectors, so that the detector views itself, instead of the baffle. In particular, the surfaces of the baffle visible to the detector are micro-machined or otherwise configured with a series of corner reflectors that return impinging optical flux from inside the optical system back to its source. The internal surfaces of each corner cube structure exhibit high reflectivity (therefore low emissivity) to provide an apparent low flux background to the detector. The lower flux background resulting from the baffle configured with such corner reflectors improves the signal-to-noise ratio (SNR) by reducing the background noise internal to the optical system. In general, lower noise/higher SNR increases the detection range for objects in the telescope field of view.

In addition to, or alternatively, the support structures within a telescope can be similarly configured, so that the detector views itself, instead of the support structures. In particular, the surfaces of the support structures visible to the detector are micro-machined or otherwise configured with a series of corner reflectors that return impinging optical flux from inside the optical system back to its source. This technique of using corner cube reflectors on detector-facing mirror support structures (such as struts) can be used with conventional telescope designs having an external baffle, or with telescopes having an integrated baffle design as described herein.

Optical System with Integrated Baffle

FIG. 1 is an optical system configured in accordance with an embodiment of the present invention. As can be seen, the system includes a telescope 105 having an integrated baffle. The telescope 105 is optically coupled to a detector and dewar assembly 107, which is operatively coupled to a cold supply 109 (e.g., high-pressure nitrogen gas or other suitable coolant). A read-out circuit 111 receives detection signals from the detector 107, and performs any processing (e.g., digitization, integration, filtering, etc) necessary for subsequent operations (e.g., 2-D and/or 3-D image formation, discrimination between target and counter-measures, etc). A cover 103 may also be provided to protect the input aperture of the telescope 105.

The optical system can be configured for any number of purposes, including surveillance, tracking/targeting, camera, or other such sensing/imaging applications. Other supporting componentry and features specific to the given application may be integrated into or otherwise operatively coupled to the system, as will be apparent in light of this disclosure. Each of the cover 103, detector and dewar assembly 107, cold supply 109, read-out circuit 111, and any processing modules or additional componentry (not shown) can be implemented with conventional technology. The actual implementation of these conventional components will depend on factors such as the type of radiation being detected and the degree of desired accuracy. As will further be appreciated, components such as the cover, dewar assembly and cold supply are optional, and their use will depend on the demands of the given application. The telescope 105 will be discussed in greater detail with reference to FIGS. 2a through 6.

In one specific example embodiment, the detector 107 is configured with a focal plane array (FPA) to detect radiation in the UV and/or IR frequency ranges. In one specific such case, the detector 107 is implemented as a dual mode monolithic FPA capable of switching between a passive IR mode to an active LADAR mode, by switching the bias across the cells of the array, as described in U.S. Pat. No. 6,864,965, titled "Dual-Mode Focal Plane Array for Missile Seekers." In another example embodiment, the detector 107 is implemented as a photodetector device capable of simultaneously detecting two or more selected wavelengths of light on a pixel-registered basis, as described in U.S. Pat. No. 6,875,975, titled "Multi-Color, Multi-Focal Plane Optical Detector." In another example embodiment, the detector 107 is implemented as a quantum dot infrared photodetector (QDIP) FPA for sensing one or more colors, as described in U.S. Pat. No. 6,906,326, titled "Quantum Dot Infrared Photodetector Focal Plane Array." In another example embodiment, the detector 107 is implemented as a tunable quantum well infrared photodetector (QWIP) FPA that is configured for dynamic bias-controlled spectral tunability for performing the likes of imaging and spectroscopy, as described in U.S. Pat. No. 7,291,858, titled "QWIP with Tunable Spectral Response." The detector 107 may employ enhanced optical coupling techniques to improve absorption capability and efficiency (e.g., reflective coatings and light-coupling gratings to prevent photons from bouncing out of detector sensing areas, such as those described in U.S. Pat. No. 7,238,960, titled "QWIP with Enhanced Optical Coupling." Each of the U.S. Pat. Nos. 6,864,965, 6,875,975, 6,906,326, 7,291,858, and 7,238,960 is herein incorporated by reference in its entirety.

Figure 2A:
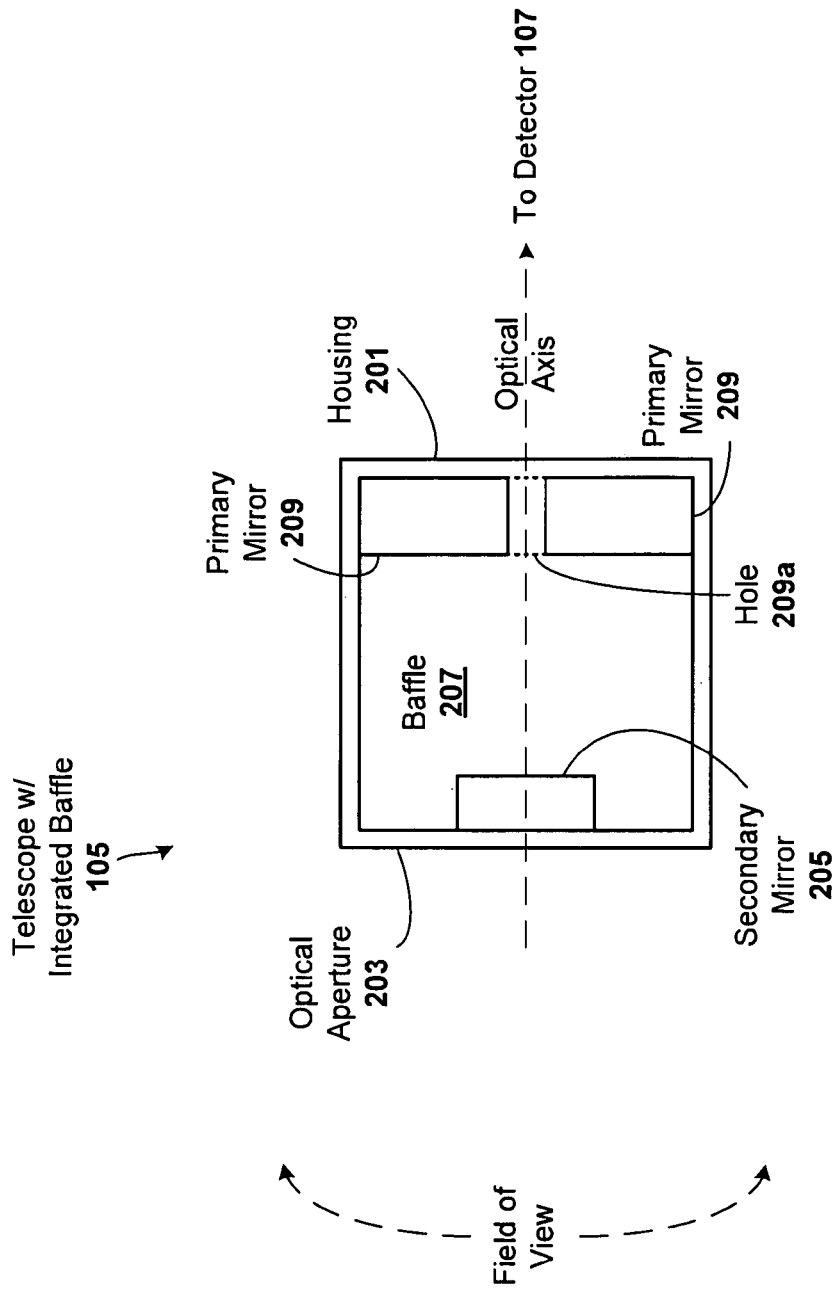
FIG. 2a is a telescope of the optical system shown in FIG. 1, configured in accordance with an embodiment of the present invention.

FIG. 2a is a telescope 105 of the optical system shown in FIG. 1, configured in accordance with an embodiment of the present invention. As can be seen, the telescope 105 includes a housing 201, an optical aperture 203, a primary mirror 209, a secondary mirror 205, and an integrated baffle 207. Although any number of telescope configurations can be used, one example embodiment implements a Cassegrain configuration.

In particular, a Cassegrain configuration of telescope 105 includes a folded optical path achieved by primary mirror 209 and the secondary mirror 205, which are both aligned symmetrically about the optical axis. The larger primary mirror 209 is a concave parabolic mirror having a central hole 209a, and the smaller secondary mirror is a convex hyperbolic mirror. In operation, radiation from the FOV enters the telescope 105 through optical aperture 203 and strikes the primary mirror 209, which reflects the radiation back to the secondary mirror 205. The secondary mirror then reflects the radiation through hole 209a, toward the detector 107. Note that each mirror's particular configuration (e.g., convex/concave, parabolic/hyperbolic, etc) can vary depending on the particular design, and the present invention is not intended to be limited to the example mirror configurations provided herein.

Figure 4:
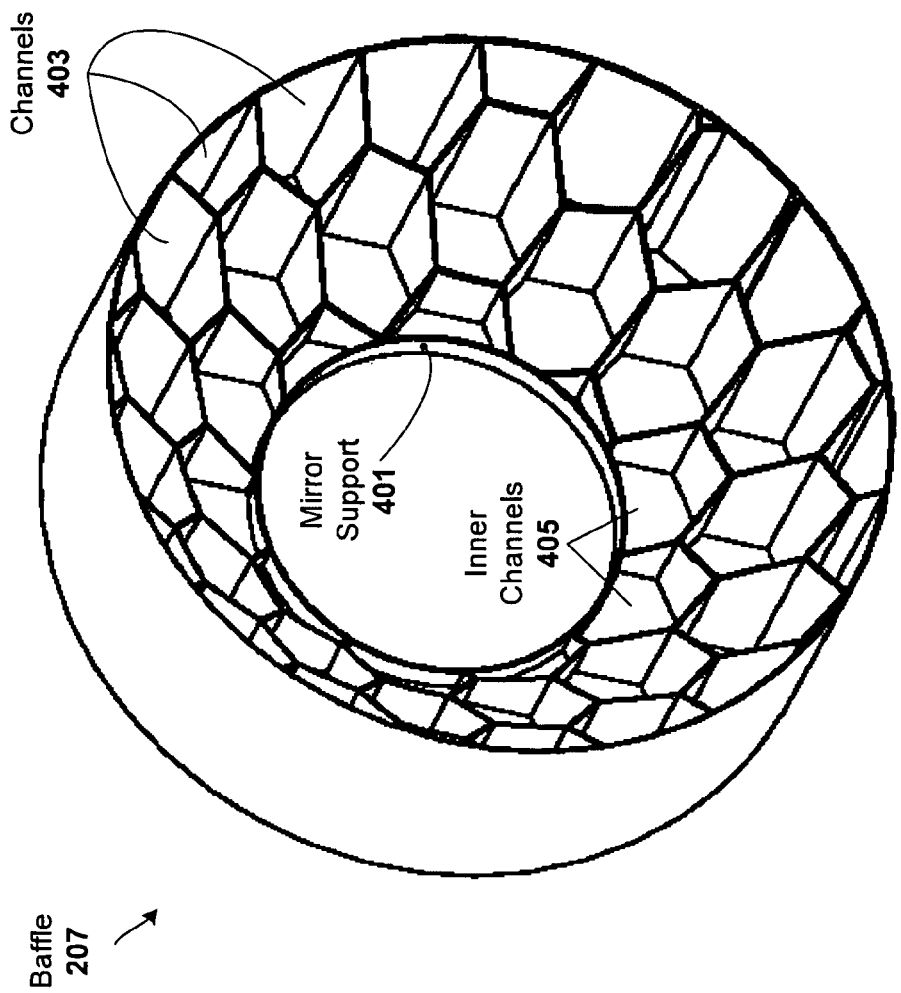
FIG. 4 is a perspective view of an integrated baffle configured in accordance with an embodiment of the present invention.

The mirrors 205 and 209 can be implemented with conventional technology, and their respective sizes can be scaled to meet range detection requirements within the physical constraints of the housing 201. In the example embodiment shown, the primary mirror 209 is sized such that it is held in place by the walls of housing 201, and the secondary mirror 205 is held in place by a mirror collar or partial collar formed at the central portion of the baffle 207 (as best shown in FIG. 4). Mirror 209 may alternatively be held by one or more mirror struts extending from the walls of housing 201, as is sometimes done. As can be seen, the centroid of the collar, partial collar, or other mirror support means can be substantially located on the optical axis of the system, in accordance with some embodiments. Numerous optical configurations will be apparent in light of this disclosure. For instance, Cassegrain variants such as the Dall-Kirkham and Ritchey-Chretien telescopes may be employed. In addition, the size of optical aperture 203 can also vary, for example, from 1 to 50 centimeters. In a more general sense, the optical elements of telescope 105 can be selected based on the application, given performance criteria such as desired operating range, operating wavelength for respective IR and/or laser systems, and processing speeds. In addition, any number of techniques can be used to facilitate imaging quality, such as techniques for eliminating aberrations. In any such cases, one or more mirror struts or other such mirror holding means (e.g., collars or partial collars) are integrated into the design of the baffle 207, thereby allowing integration of the baffle 207 into the housing 201, without significantly increasing the length of telescope 105.

Figure 3:
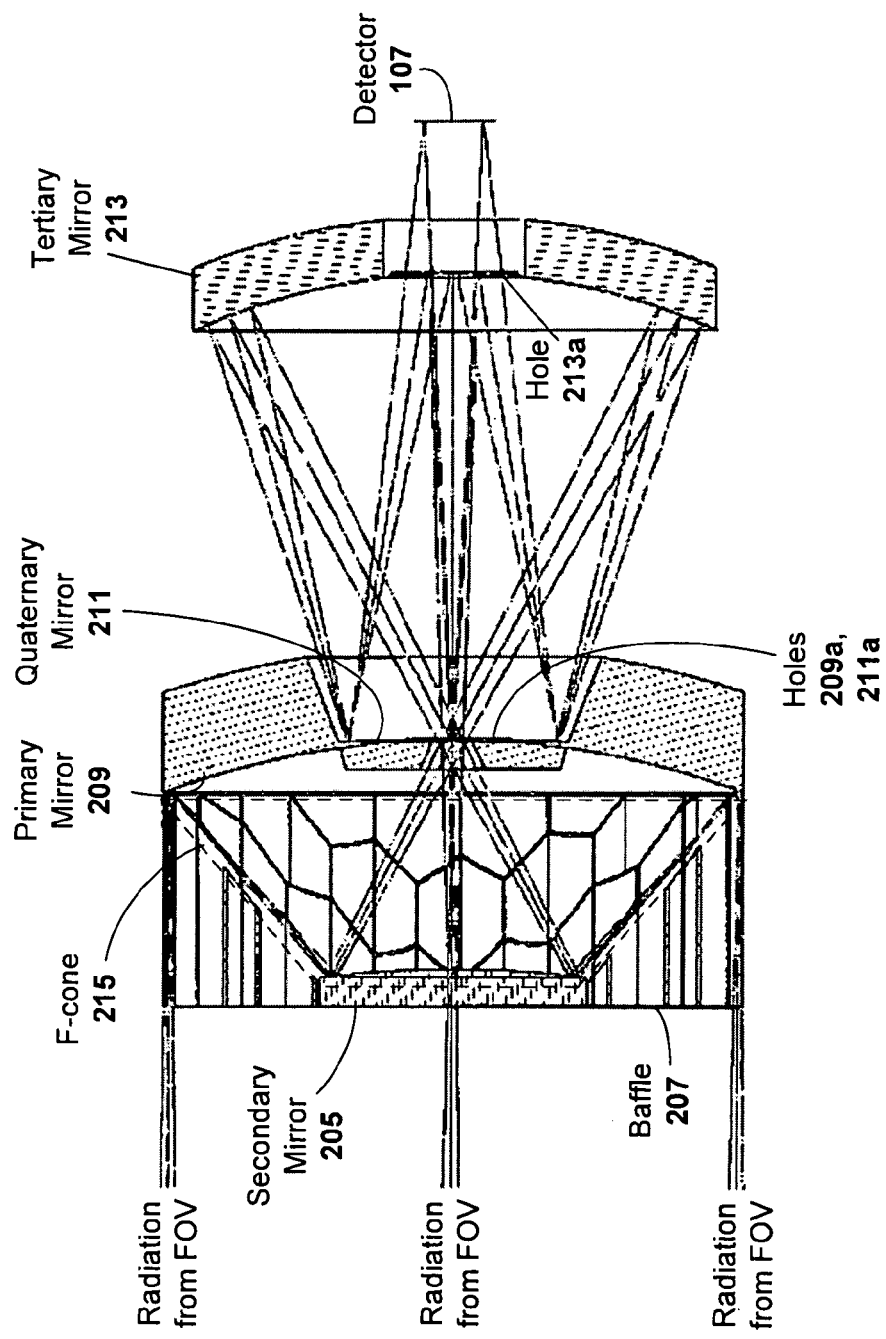
FIG. 3 is a cross-sectional side view of an optical system configured in accordance with an embodiment of the present invention.

The baffle 207 operates as both a baffle and a mirror support, in that it is used to mitigate off-axis radiation from reaching the detector 107 and to hold the secondary mirror 205 in place on the optical axis. The baffle can be made from any suitable materials, such as metal (e.g., steel, aluminum) or a reflective composite (e.g., plastic or fiberglass configured with an optically suitable coating). In general, the baffle includes a plurality of channels which selectively pass on-axis radiation, but eliminate off-axis radiation (e.g., via reflection and/or absorption). In some embodiments, the integrated baffle 207 can be shaped to the F-cone between the primary 209 and secondary 205 mirrors of telescope 105. In some such embodiments, the aspect ratio of the baffle (i.e., channel length to channel diameter cross-section) is maintained as the length tapers down from the longer outer channels to the shorter inner channels. FIGS. 3 and 4 best illustrate further details of the baffle 207, and will be discussed in turn.

Figure 6:
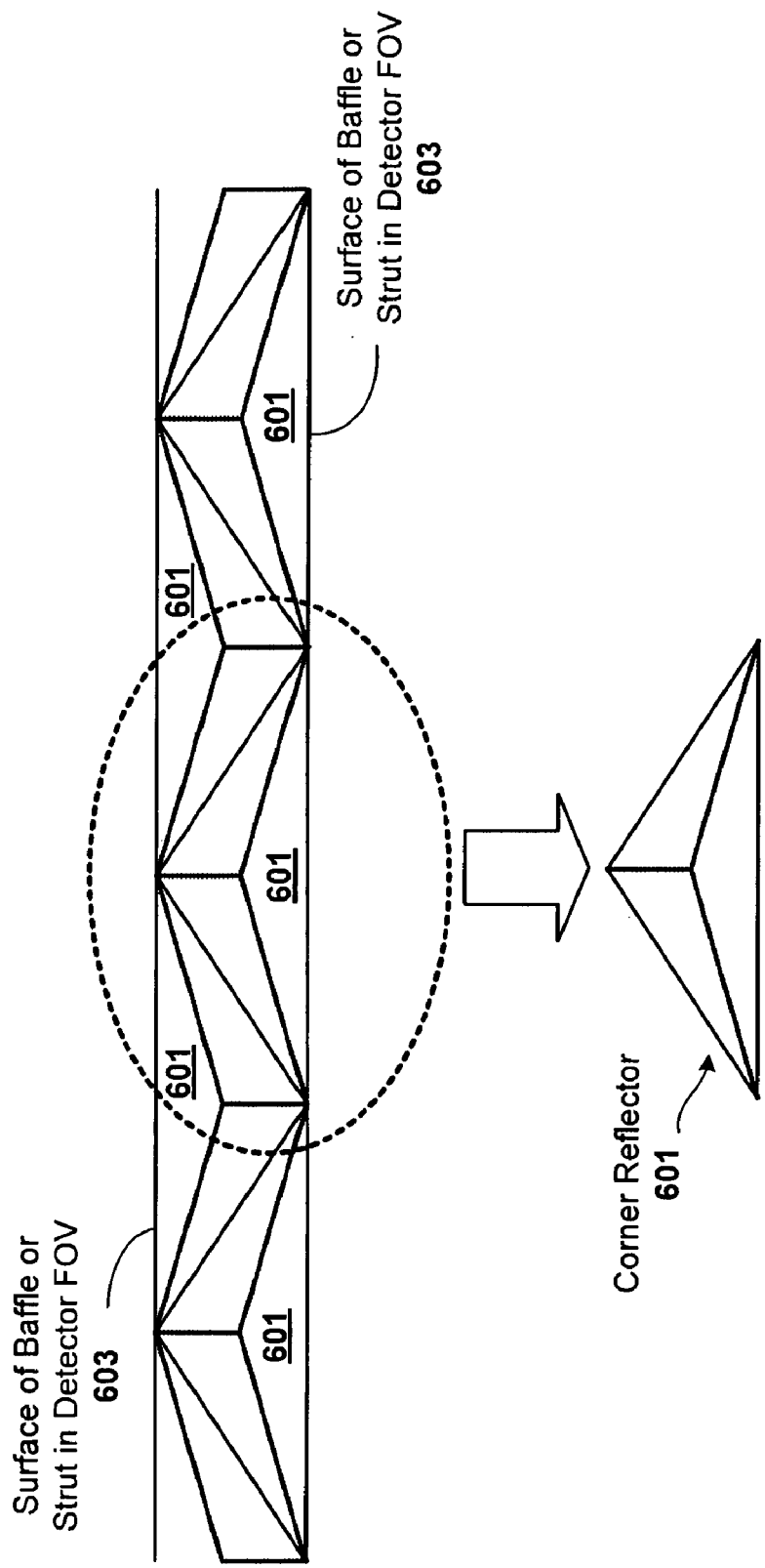
FIG. 6 illustrates corner reflectors formed on optical component edges within the FOV of the optical system, in accordance with an embodiment of the present invention.

The integrated baffle 207 may be configured with corner reflectors, so that the detector 107 views itself, instead of the baffle 207. In particular, the surfaces of the baffle visible to the detector are micro-machined or otherwise configured with a series of corner reflectors that are shaped to return impinging optical flux from inside the optical system back to its source. FIG. 6 best illustrates details of a baffle 207 configured with corner reflectors, and will be discussed in turn.

Figure 2B:
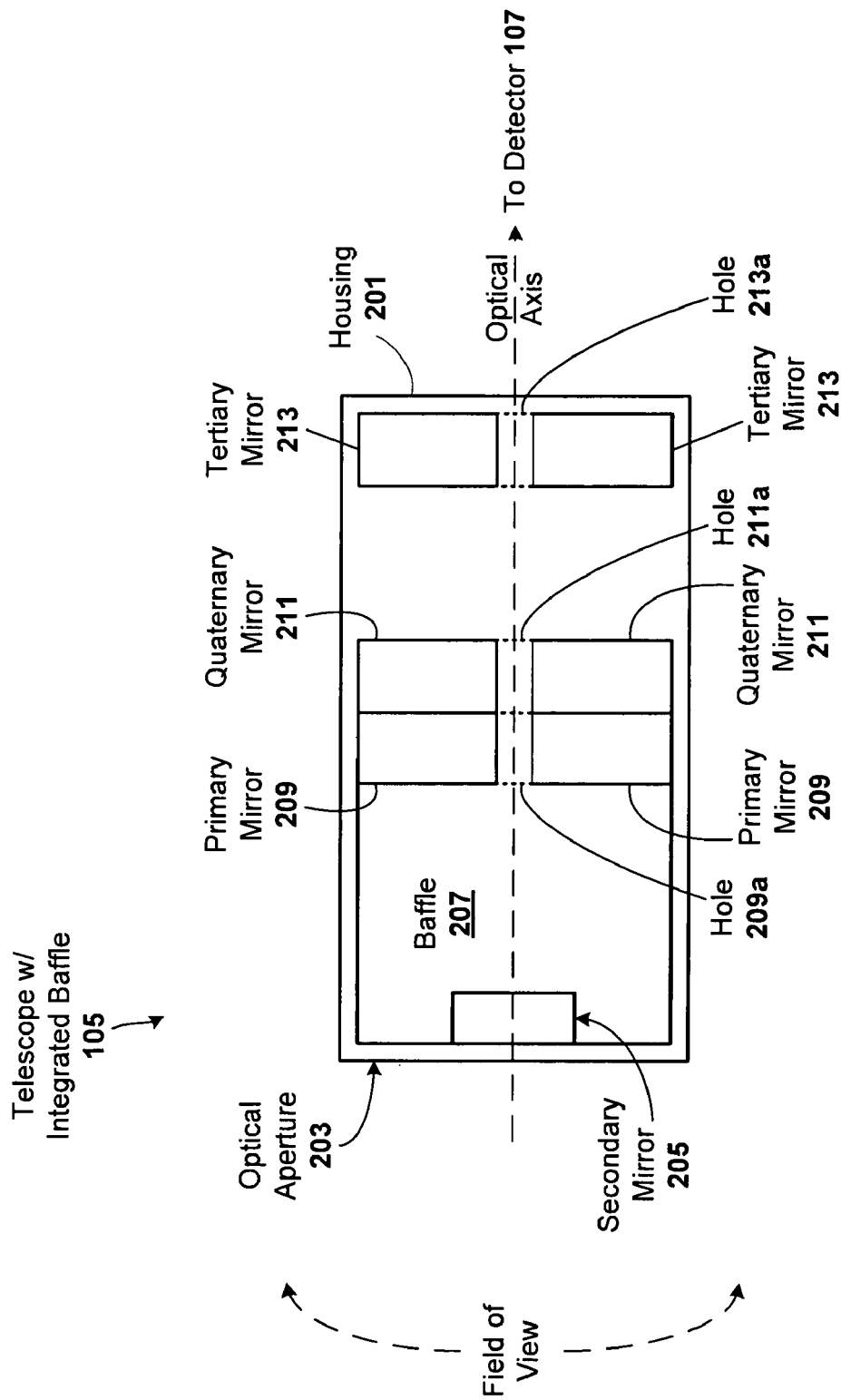
FIG. 2b is a telescope of the optical system shown in FIG. 1, configured in accordance with another embodiment of the present invention.

FIG. 2b is a telescope of the optical system shown in FIG. 1, configured in accordance with another embodiment of the present invention. This embodiment is similar to that shown in FIG. 2a, but further includes a conventional two mirror re-imager configuration. In more detail, the two mirror re-imager includes the addition of a convex hyperbolic quaternary mirror 211 and a concave parabolic tertiary mirror 213. In operation, radiation from the FOV enters the telescope 105 through optical aperture 203 and strikes the primary mirror 209, which reflects the radiation back to the secondary mirror 205. The secondary mirror 205 then reflects the radiation through holes 209a and 211a, toward the tertiary mirror 213. The tertiary mirror 213 reflects the radiation back to the quaternary mirror 211, which reflects the re-imaged radiation through hole 213a, and toward the detector 107. As previously noted, each mirror's particular configuration (e.g., convex/concave, parabolic/hyperbolic, etc) can vary depending on the particular design, and the present invention is not intended to be limited to the example mirror configurations provided herein.

Each of the primary 209, secondary 205, tertiary 213, and quaternary 211 mirrors can be formed individually. Alternatively, the primary 209 and quaternary 211 mirrors can be integrally formed, as is sometimes conventionally done. The mirrors 211 and 213 can be implemented with conventional technology, and their respective sizes can be scaled to meet range detection requirements within the physical constraints of the housing 201. In the example embodiment shown, the tertiary mirror 213 is sized such that it is held in place by the walls of housing 201. Alternatively, mirror 213 may be held by one or more mirror struts extending from the walls of housing 201, as is sometimes done. The quaternary mirror 211 may also be held in place by conventional holding means, or by virtue of it being integrated with the retained primary mirror 209. As previously explained, numerous optical configurations will be apparent in light of this disclosure, and the present invention is not intended to be limited to any particular such configurations. Rather any such configurations can be used with an integrated baffle having a mirror holding means, as described herein.

As previously explained with reference to FIG. 2a, the integrated baffle 207 may be configured with corner reflectors, so that the detector 107 views itself, instead of the baffle 207.

FIG. 3 is a cross-sectional side view of the optical system shown in FIG. 2b, configured in accordance with an embodiment of the present invention. As previously described, this example telescope 105 includes a Cassegrain configuration with a two mirror re-imager, including primary 209, secondary 205, tertiary 213, and quaternary 211 mirrors. Also note that in this particular example, the primary 209 and quaternary 211 mirrors are integrally formed, with the smaller quaternary mirror 211 formed on the back of the larger primary mirror 209.

As can be further seen in this example embodiment, the integrated baffle 207 is shaped to the F-cone 215 between the primary 209 and secondary 205 mirrors of the telescope 105, as indicated with dashed lines. By conforming the shape of baffle 207 to the F-cone 215 of the optical system, the overall length of the optical system can be reduced. In addition, the mirror support (e.g., strut) that normally supports the secondary mirror 205 in conventional designs can be incorporated into the baffle 207 further reducing the weight and optical obscuration. In such cases, the baffle 207 performs a strut function and eliminates the need for a separate mirror support structure. The pattern (e.g., honeycomb) used to form the baffle 207 can be adjusted to minimize the total obscuration of the baffle 207 to improve the optical throughput.

Baffle Shaped to F-Cone

FIG. 4 is a perspective view of an integrated baffle configured in accordance with an embodiment of the present invention. As previously explained, the baffle 207 can be used for off-axis rejection of light and support for the secondary mirror 205 (or other internal optic requiring support) in an optical telescope. The baffle 207 can be used, for example, in imaging systems that have optical telescopes that operate from the UV to the far IR frequency range.

As can be seen in the example embodiments of FIGS. 3 and 4, the baffle 207 can be contoured or tailored to the F-cone of the optical system in addition to providing support for the secondary mirror 205. In addition, and as best shown in FIG. 4, the baffle 207 includes a mirror support 401 for holding the secondary mirror 205 (or other optic). The support 401 in this example embodiment is in the form of a collar, but may be implemented as a partial collar (e.g., such as a partial collar that contacts the mirror perimeter at three positions approximately 120 degrees apart from one another), or as conventional struts.

The openings or channels (sometimes called cells) in the baffle vary in size over the optical aperture 203. In particular, larger openings are provided at the edge of the aperture (outer channels 403), while relatively smaller openings are provided near center of the aperture 203 (inner channels 405) and more specifically, near the mirror support 401. This is allowed, since for a given off-axis rejection, a length to diameter (L/D) or aspect ratio is defined. The length for the baffle channels can be longer at the edge due to the F-cone (outer channels 403) and hence the diameter of those channels can be larger for a constant L/D ratio. In general, larger diameter channels equate to lower optical obscuration.

In some such embodiments, the aspect ratio of the baffle is maintained as the length tapers down from the longer/wider outer channels 403 to the shorter/narrower inner channels 405 (or otherwise follows the envelope of the F-cone), wherein the inner channels 405 have a length and diameter that is about one-half of the length and diameter, respectively, of the outer channels 403. In one particular such example, the outer channels 403 are approximately 1 to 4 centimeters long and 1 to 2 centimeters in diameter, and the inner channels 405 are approximately 0.5 to 2 centimeters long and 0.5 to 1 centimeters in diameter.

The baffle 207 can be made from any suitable materials, such as metal (e.g., steel, aluminum) or reflective composite (e.g., plastic or fiberglass configured with an optically suitable coating). In addition, other baffle features can be employed that allow for use of the baffle, for example, as an RF shield or a long wave optical filter. In one such case, the baffle is configured to provide effective RF shielding up to a frequency defined by the cell size (e.g., honeycomb shape such as hexagons). Higher frequency radio waves would not be shielded. In another such case, materials that are transparent at optical radiation frequencies, but exhibit a blocking or filtering effect to other frequencies can be used to encase or coat the baffle. In other such cases, reflective baffles can be configured to reflect away external heat loads. Other such baffle features will be apparent in light of this disclosure.

Corner Reflectors for Reducing Internally Generated Background Flux

Figure 5:
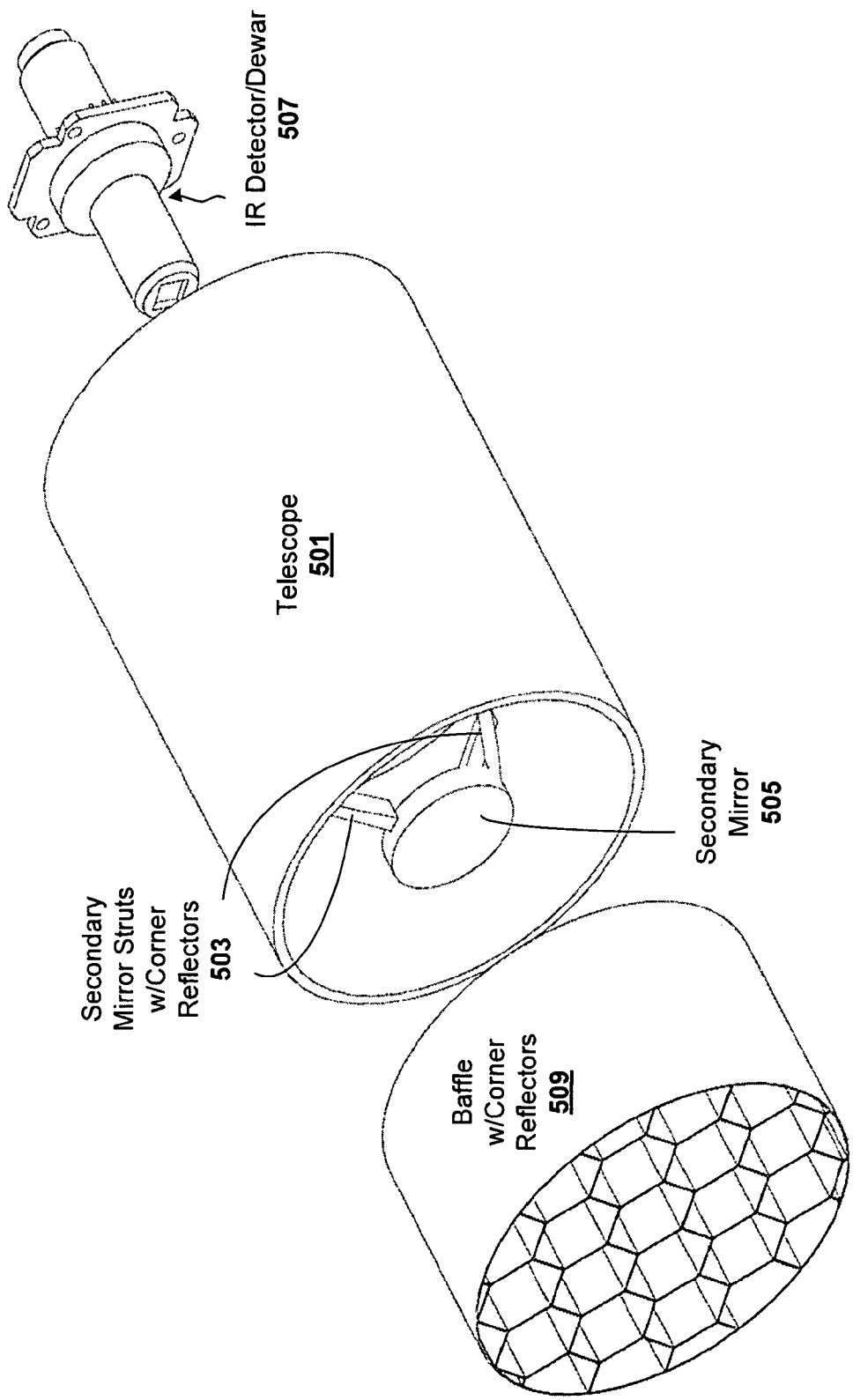
FIG. 5 is a perspective view of an optical system configured with corner reflectors for reducing internally generated background flux, in accordance with an embodiment of the present invention.

FIG. 5 is a perspective view of an optical system. Each of the baffle 509, telescope 501 (including mirror struts 503 and secondary mirror 505), and IR detector/dewar 507 can generally be implemented as conventionally done. However, and in accordance with another embodiment of the present invention, the interior facing surfaces of the baffle 509 and/or mirror struts 503 are configured with corner reflectors 601 as will be described in turn, and as best shown in FIG. 6. This approach can be used for any number of systems, such as those having on-axis optical telescopes that operate in a range from the near to far IR.

In a more general sense, any structure, element or support that has a surface (including any significant or non-razor thin edges) that is within the FOV of the detector 507 can be treated with a plurality of corner reflectors 601 to reduce unwanted internal IR flux. In addition, note that the baffle 509 of the example embodiment shown in FIG. 5 is a conventional baffle that is bolted or otherwise externally coupled to the outside of the telescope 501 in front of the optical aperture. Other embodiments may employ a telescope having an integrated baffle as previously described. Note that this approach is effective independent of the size or shape of the structure that is within the FOV of the IR detector 507.

In general, the IR detector 507 of conventional telescope designs receives flux from the mirror struts 503 which is proportional to the area (as seen by the detector 507), emissivity and temperature. In addition, the IR telescope 501 is at the operational temperature of the system, which causes a large amount of unwanted background flux to be collected by the detector 507. To reduce this unwanted background flux, the surfaces of the struts 503 that face the detector 507 are micro-machined or otherwise configured with corner reflectors 601 to provide a low flux strut.

The low flux strut approach significantly reduces the optics induced background flux for on-axis optical systems. This reduction allows the IR detector 507 to operate in an external background limited performance regime. The use of a corner reflectors 601 to reduce the flux as seen by an IR detector can also be applied to the surfaces of a baffle assembly (whether external baffle 509 or internal baffle 207), or other structures that the detector 507 views.

FIG. 6 illustrates corner reflectors formed on optical component edges within the FOV of the optical system, in accordance with an embodiment of the present invention. As can be seen, the interior facing surface 603 of the baffle or support strut (or other structure) is micro-machined with a series of corner reflectors 601 that return impinging optical flux from inside the optical system back to its source. For an on-axis optical system, this becomes the cold part of the detector/dewar assembly.

The internal surfaces of each corner cube structure are high reflectivity (therefore low emissivity) to provide an apparent low flux background to the detector. For IR systems using baffles, the unwanted flux is also reduced by micromachining corner reflectors on the normal surface of the baffle. Thus, any surfaces (including edges) in the detector FOV can be micromachined or otherwise configured with corner reflectors 601. Increased SNR and detection range for objects results in the telescope FOV, due to reduced background flux.

The micro-machining can be carried out, for example, manually using metal shaping tools (e.g., files and hand lathes) on the metal surfaces of the structures within the detector FOV. Alternatively, the micro-machining can be carried out using an automatic CNC process capable of precise and high-speed machining of the metal surfaces of the structures within the detector FOV. To this end, conventional CNC programming and machining techniques can be employed to mill or otherwise form the corner reflectors 601. Alternatively, non-metallic structures (such as plastic or composite support struts and baffle structures) can be formed, for example, using injection molding techniques, wherein the mold used to form the structure includes the features of the corner reflectors 601. Then, the structure integrally formed with the corner reflector 601 features can be coated with a highly reflective material (e.g., metal dip or spray) to form the highly reflective corner reflectors 601. Alternatively, the corner reflectors 601 can be formed as individual pieces that are then bonded or otherwise securely attached (e.g., glued, soldered) to the surface 603. These individual pieces may be machined metal pieces (e.g., using CNC processes), or non-metallic pieces formed with the corner reflector 601 features (e.g., injection molding) having an outer reflective layer.

In one specific embodiment, the corner reflectors 601 are configured as corner cubes, each having three mutually perpendicular faces, as best shown in the dashed circle of FIG. 6. In a more general sense, the reflectors 601 have the attribute of returning optical flux from inside the optical system back in the direction it was received thereby having the IR detector view the cold parts (hence low flux) of the detector assembly. The individual mirrors that form the corner reflector can be, for example, triangular (e.g., isosceles right triangles) or square or have any other suitable shape. Theoretically, corner reflectors comprised of square mirrors reflect a higher percentage of incident light relative to corner reflectors comprised of triangular mirrors.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. An optical system having an optical axis, comprising:
a mirror for reflecting on-axis radiation; and
an integrated baffle for preventing passage of off-axis radiation, and for supporting the mirror in place on the optical axis, wherein the integrated baffle includes a plurality of channels each having a length and a diameter, and the integrated baffle is shaped to an F-cone of the system such that channel length tapers down from longer outer channels to shorter inner channels.

2. The system of claim 1, further comprising:
a detector for receiving on-axis radiation reflected by the mirror.

3. The system of claim 1, further comprising:
a telescope housing having an optical aperture, and for containing the baffle and mirror of the system.

4. The system of claim 3 wherein the mirror is a secondary mirror, the system further comprising:
a primary mirror for reflecting radiation that passes through the optical aperture toward the secondary mirror;
wherein the secondary mirror is for reflecting radiation from the primary mirror to a hole in the primary mirror.

5. The system of claim 4, further comprising tertiary and quaternary mirrors, wherein:
the tertiary mirror is for reflecting radiation that passes through the hole in the primary mirror toward the quaternary mirror; and
the quaternary mirror is for reflecting radiation from the tertiary mirror to a hole in the tertiary mirror.

6. The system of claim 1 wherein the system is a telescope having a Cassegrain configuration with a two mirror re-imager.

7. The system of claim 1 wherein the plurality of channels selectively pass on-axis radiation, but eliminate off-axis radiation.

8. The system of claim 1 wherein the shorter inner channels have a length and diameter that is about one-half of the length and diameter, respectively, of the length and diameter of the longer outer channels.

9. The system of claim 1 wherein the mirror is a secondary mirror, the system further comprising:
a primary mirror for reflecting radiation toward the secondary mirror;
wherein the F-cone is between the primary and secondary mirrors.

10. The system of claim 1 wherein an aspect ratio of channel length to channel diameter is maintained as channel length tapers down from the longer outer channels to the shorter inner channels.

11. The system of claim 1 wherein surfaces of the integrated baffle visible to a detector of the system are configured with a plurality of corner reflectors that are shaped to return impinging optical flux from inside the optical system back to its source.

12. An optical system having an optical axis, comprising:
a telescope housing having an optical aperture;
a primary mirror and a secondary mirror within the telescope housing, the primary mirror for reflecting radiation that passes through the optical aperture toward the secondary mirror, and the secondary mirror for reflecting radiation from the primary mirror to a hole in the primary mirror;
an integrated baffle within the telescope housing for preventing passage of off-axis radiation, and for supporting the secondary mirror in place on the optical axis, wherein the integrated baffle includes a plurality of channels each having a length and a diameter, and the integrated baffle is shaped to an F-cone between the primary and secondary mirrors such that channel length tapers down from longer outer channels to shorter inner channels; and
a detector for detecting on-axis radiation reflected by the secondary mirror.

13. The system of claim 12, further comprising tertiary and quaternary mirrors, wherein:
the tertiary mirror is for reflecting radiation that passes through the hole in the primary mirror toward the quaternary mirror; and
the quaternary mirror is for reflecting radiation from the tertiary mirror to a hole in the tertiary mirror.

14. The system of claim 12 wherein the plurality of channels selectively pass on-axis radiation, but eliminate off-axis radiation.

15. The system of claim 12 wherein the shorter inner channels have a length and diameter that is about one-half of the length and diameter, respectively, of the length and diameter of the longer outer channels.

16. The system of claim 12 wherein an aspect ratio of channel length to channel diameter is maintained as channel length tapers down from the longer outer channels to the shorter inner channels.

17. The system of claim 12 wherein surfaces of the integrated baffle visible to a detector of the system are configured with a plurality of corner reflectors that are shaped to return impinging optical flux from inside the optical system back to its source.

18. An optical system having an optical axis, comprising:
a telescope housing having an optical aperture;
a primary mirror and a secondary mirror within the telescope housing, the primary mirror for reflecting radiation that passes through the optical aperture toward the secondary mirror, and the secondary mirror for reflecting radiation from the primary mirror to a hole in the primary mirror;
an integrated baffle within the telescope housing for preventing passage of off-axis radiation, and for supporting the secondary mirror in place on the optical axis, wherein the integrated baffle includes a plurality of channels which selectively pass on-axis radiation but eliminate off-axis radiation, and is shaped to an F-cone between the primary and secondary mirrors such that channel length tapers down from longer outer channels to shorter inner channels; and
a detector for detecting on-axis radiation reflected by the secondary mirror.

19. The system of claim 18 wherein each of the channels has a length and a diameter, and an aspect ratio of channel length to channel diameter is maintained as channel length tapers down from the longer outer channels to the shorter inner channels.

20. The system of claim 18 wherein surfaces of the integrated baffle visible to a detector of the system are configured with a plurality of corner reflectors that are shaped to return impinging optical flux from inside the optical system back to its source.

* * * * *